United States Patent [19]

Hashimoto et al.

[11] Patent Number: 4,701,081
[45] Date of Patent: Oct. 20, 1987

[54] BORING PROCESS AND APPARATUS

[75] Inventors: Hitoshi Hashimoto, Iruma; Yoshihiro Tamaki, Tsurugashima; Kazufumi Mikami, Kawagoe; Kiyoshi Shimogai, Oozu, all of Japan

[73] Assignee: Honda Giken Kogyo Kabushiki Kaisha, Tokyo, Japan

[21] Appl. No.: 827,785

[22] Filed: Feb. 7, 1986

[30] Foreign Application Priority Data

Feb. 15, 1985 [JP] Japan ................................. 60-27787

[51] Int. Cl.⁴ ............................................. B23B 41/12
[52] U.S. Cl. ..................................... 408/1 R; 408/35; 408/50; 408/54; 408/708
[58] Field of Search ................. 408/707, 708, 705, 35, 408/36, 45, 49, 50, 54, 55, 714, 127, 70, 187, 234, 1 R; 409/213, 187, 197, 198, 221, 222, 223, 230; 82/1.4

[56] References Cited

U.S. PATENT DOCUMENTS

| | | | |
|---|---|---|---|
| 2,701,482 | 2/1955 | Osso | 408/55 |
| 4,132,494 | 1/1979 | Aldridge, Jr. | 408/708 |
| 4,422,265 | 12/1983 | Branston | 409/198 |
| 4,451,186 | 5/1984 | Payne | 408/54 |

FOREIGN PATENT DOCUMENTS 57-178609 11/1982 Japan .
58-11458 4/1983 Japan .

Primary Examiner—Z. R. Bilinsky
Attorney, Agent, or Firm—Roberts, Spiecens & Cohen

[57] ABSTRACT

A boring apparatus and process comprising suspending a boring bar for boring a hole in a workpiece for universal pivotal movement in all directions. Then, the workpiece is brought below the boring bar with the axis of the hole being vertical. Thereafter, the boring bar is lowered and eccentrically passed through the hole in the workpiece and slidably and rotatably supported at least at two-points thereof axially spaced apart. Then, the boring is effected by the rotation and axial relative movement of the boring bar with respect to the workpiece, with the axis of the boring bar aligned with the axis of the workpiece.

16 Claims, 20 Drawing Figures

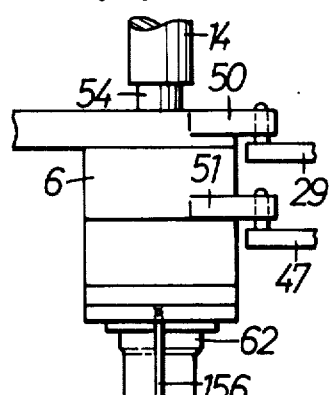
FIG.17
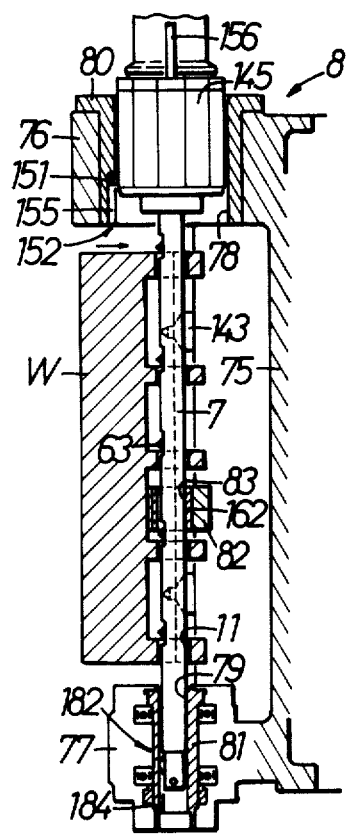
FIG.18
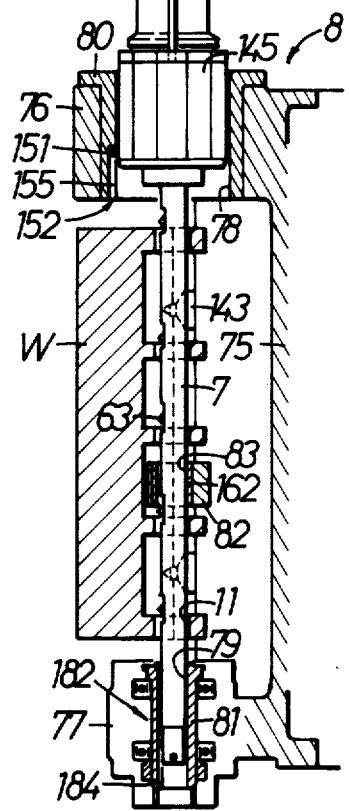

BORING PROCESS AND APPARATUS

BACKGROUND OF THE INVENTION

1. Field of the Invention

The present invention relates to a process and apparatus for boring a workpiece having a hole which is to be bored over a relatively great long distance in the axial direction, for example, a cylinder block for an engine having a plurality of bearing holes concentrically formed therein at spaced locations for supporting a crankshaft, or a cylinder head for an engine having a plurality of bearing holes concentrically formed therein at spaced locations for supporting a cam shaft.

2. Description of the Prior Art

In boring such a workpiece as disclosed in Japanese Utility Model Publication Kokoku No. 11458/83, it is a conventional practice to support the workpiece with the axis of the hole to be bored being horizontal and to move a horizontally oriented boring bar in a horizontal direction to effect the boring.

However, when the hole to be bored is relatively long in the axial direction, the boring bar is also correspondingly long. For this reason, a deflection may be produced in the boring bar in the portion between the bearing portions due to its own weight to cause a so-called skipping phenomenon and consequently, the working accuracy may be adversely affected. Therefore, the speed of the rotation of the boring bar must be kept rlelatively low, resulting in a low working rate.

SUMMARY OF THE INVENTION

It is therefore an object of the present invention to provide a boring process wherein a boring bar is rotatively driven about a vertical axis to effect the boring, so that deflection of the boring bar may be prevented to improve the working accuracy, while the bearing structure of the boring bar is simplified and further, the working efficiency is also improved.

It is another object of the present invention to provide a boring apparatus most suitable for carrying out such a boring process.

To accomplish the above objects, according to the present invention, there is provided a boring process comprising the steps of suspending a boring bar for boring a hole in a workpiece for pivotal movement in all directions, bringing the workpiece below the boring bar with the hole being vertical and then lowering the boring bar to eccentrically pass the boring bar through the hole in the workpiece and slidably and rotatably support the boring bar at least at two places spaced from each other in the axial direction, and effecting the rotation and axial relative movement of the boring bar with respect to the workpiece to effect the boring.

In addition, according to the present invention, there is provided a boring apparatus comprising a vertical post; a tool head liftable along the post and including a vertical rotary shaft; a boring bar connected at its upper end to the rotary shaft of the tool head through a universal joint and suspended from the tool head; a support jig having at least two bearing portions and disposed on the lower portion of the post for slidably and rotatably supporting the boring bar; and a workpiece support mechanism for supporting the workpiece in such a manner to enable the selective positioning of the hole in the workpiece with respect to the boring bar between eccentric and concentric positions.

As described above, the boring bar is suspended for pivotal movement in all directions and hence, it is vertically retained by its own weight. In this vertical state, the boring bar is slidably and rotatably supported and positioned concentrically with respect to the hole in the workpiece to effect the boring. Therefore, the weight of the boring bar acts in the axial direction thereof to avoid the generation of a deflection in the boring bar, thus preventing a vibration and a skipping phenomenon from being generated due to such a deflection. This enables the distance between support positions of the boring bar to be increased, leading to a reduced limitation for the workpiece and a simplified supporting structure. In addition, since the rotational speed can be increased, the working efficiency is enhanced. Further, because the boring bar is pivotally movable, the axis of the hole of the workpiece can be accurately aligned with the axis of the boring bar to enhance the working accuracy.

In addition, with the aforesaid boring apparatus, the boring bar can be pivotally movable supported on the tool head and can be also passed through the hole in the workpiece to move the workpiece to a concentrical position. The support jig is of an extremely simple construction having only at least two bearing portions. Accordingly, it is possible to provide a boring apparatus most suitable for carrying out a boring process according to the present invention.

The above and other objects, features and advantages of the present invention will become apparent from the following detailed description of a preferred embodiment taken in conjunction with the accompanying drawing.

BRIEF DESCRIPTION OF THE DRAWINGS

The drawings illustrate a boring apparatus according to one embodiment of the present invention in which;

FIG. 17 is a vertical sectional view of details for illustrating the state of boring bar inserted in the bearing hole in the workpiece on an enlarged scale; and FIG. 18 is an enlarged view in vertical section of details corresponding to FIG. 17, with the axis of the boring bar being aligned with the axis of the bearing hole in the workpiece.

DETAILED DESCRIPTION OF THE PREFERRED EMBODIMENT

Figure 1:
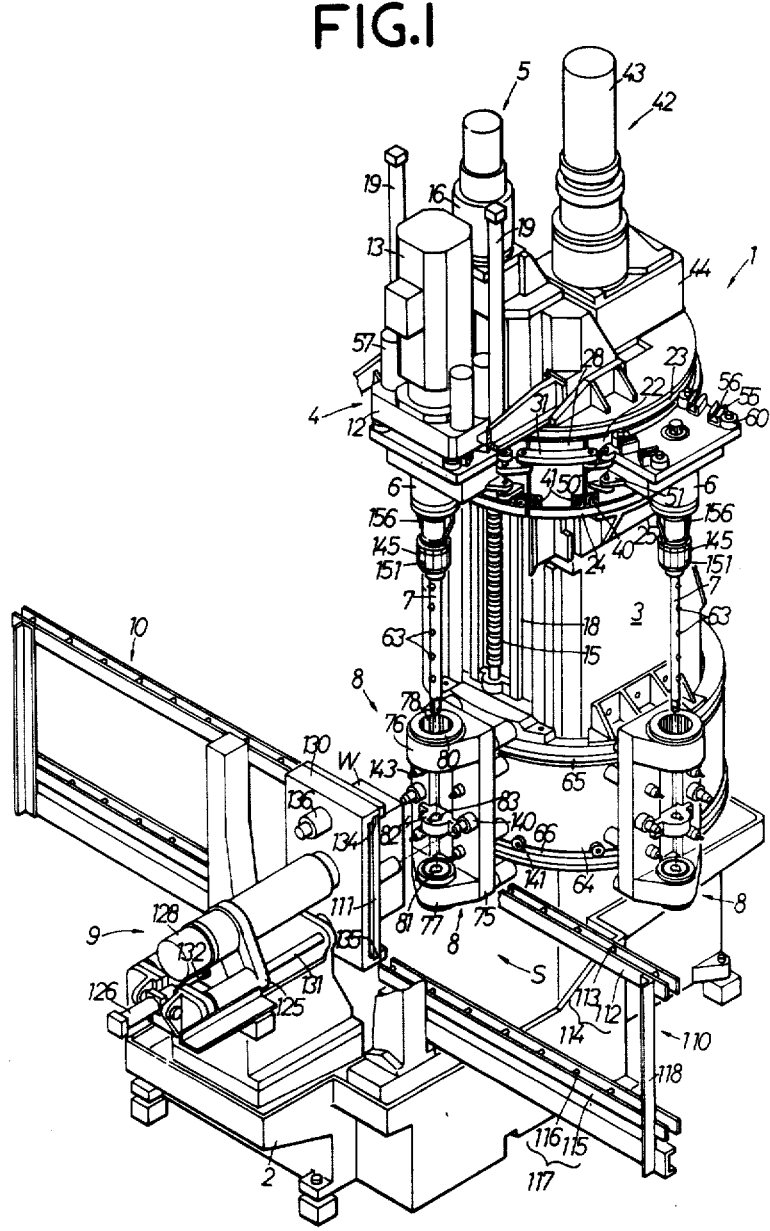
FIG. 1 is a perspective view of the boring apparatus.
Figure 2:
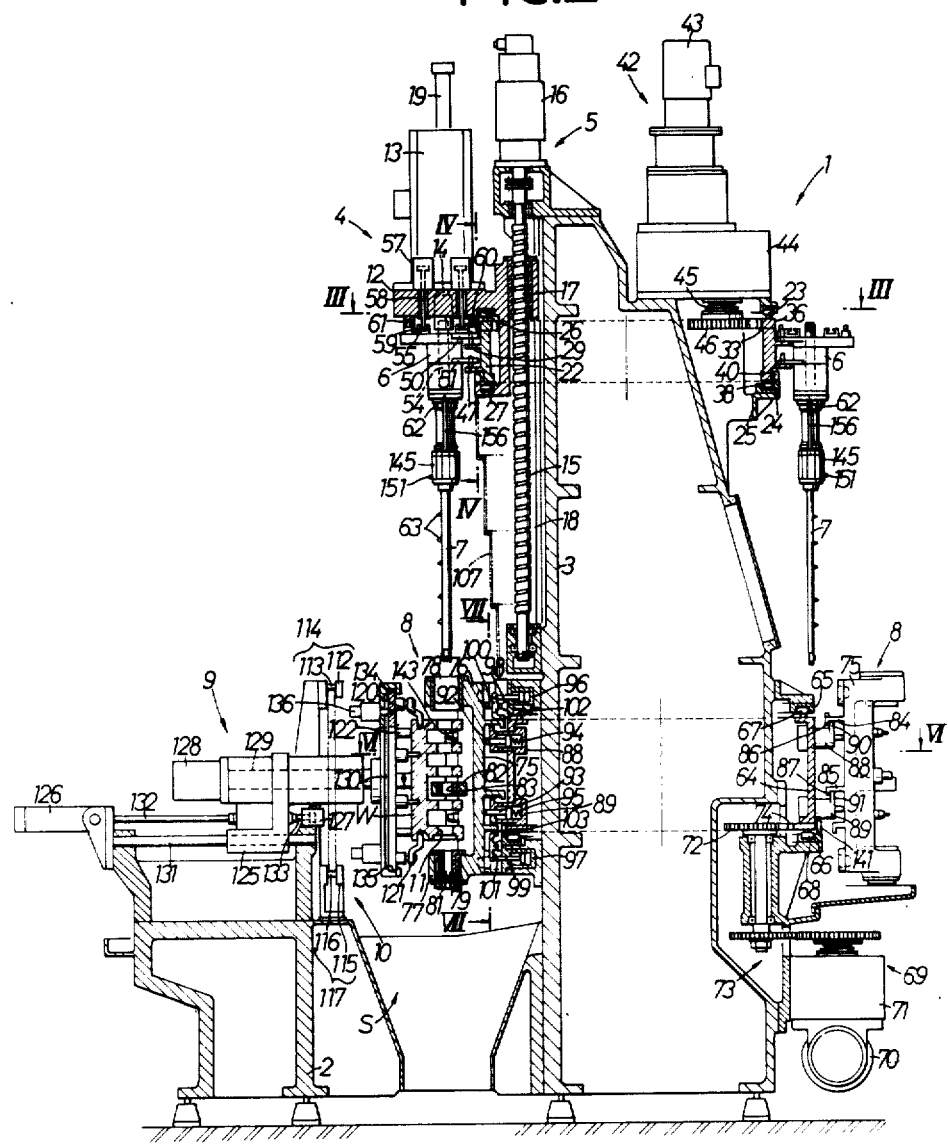
FIG. 2 is a vertical sectional view of the boring apparatus.

One embodiment of the present invention will now be described with reference to the drawings. Referring first to FIGS. 1 and 2, therein is shown a boring apparatus 1 which comprises an upright post 3 rising on a base plate 2, a drive mechanism 4 liftably disposed laterally of the post 3 at a working station S on the base plate 2, a lift mechanism 5 for liftably moving the drive mechanism 4, a plurality of, for example, four tool heads 6 each adapted to be detachably fixed on the lower portion of the drive mechanism 4 by the selective switchover thereof, and a boring bar 7 detachably connected at its upper end to each of tool heads 6 to extend downwardly and be used as a bar-like rotary working tool. The boring apparatus 1 also includes a plurality of, for example, four support jigs 8 each adapted to be fixed on the lower portion of the post 3 by the selective switchover thereof at a location corresponding to the boring bar 7, i.e., a location at the working station S, a work support mechanism 9 for supporting and positioning a workpiece W which has been transferred or conveyed to the working station S, such as a cylinder head having five bearing bores concentrically spaced from one another for a cam shaft, and a transfer or conveying mechanism 10 for the transfer-in and the transfer-out of the workpiece W to and from the working station S.

The drive mechanism 4 includes a lift rest or stand 12 horizontally disposed above the working station S to extend radially and outwardly from the post 3, and a rotary drive motor 13 carried and fixed on the upper surface of the lift rest stand 12. The rotary drive motor 13 is disposed with its output shaft 14 directed vertically, the output shaft 14 rotatably passing through the lift stand or rest 12 to have its lower end downwardly projected from the lower surface of the lift rest 12. The lower end of the output shaft 14 has a structure which enables the splined connection thereof with a rotary shaft 54 of the tool head 6 by fitting the rotary shaft 54 to the lower end from below. The rotary drive motor 13 also includes a given-position stop mechanism such that cutters 63 of the boring bar 7 may always be accurately oriented in an opposite direction to the post 3.

Figure 3:
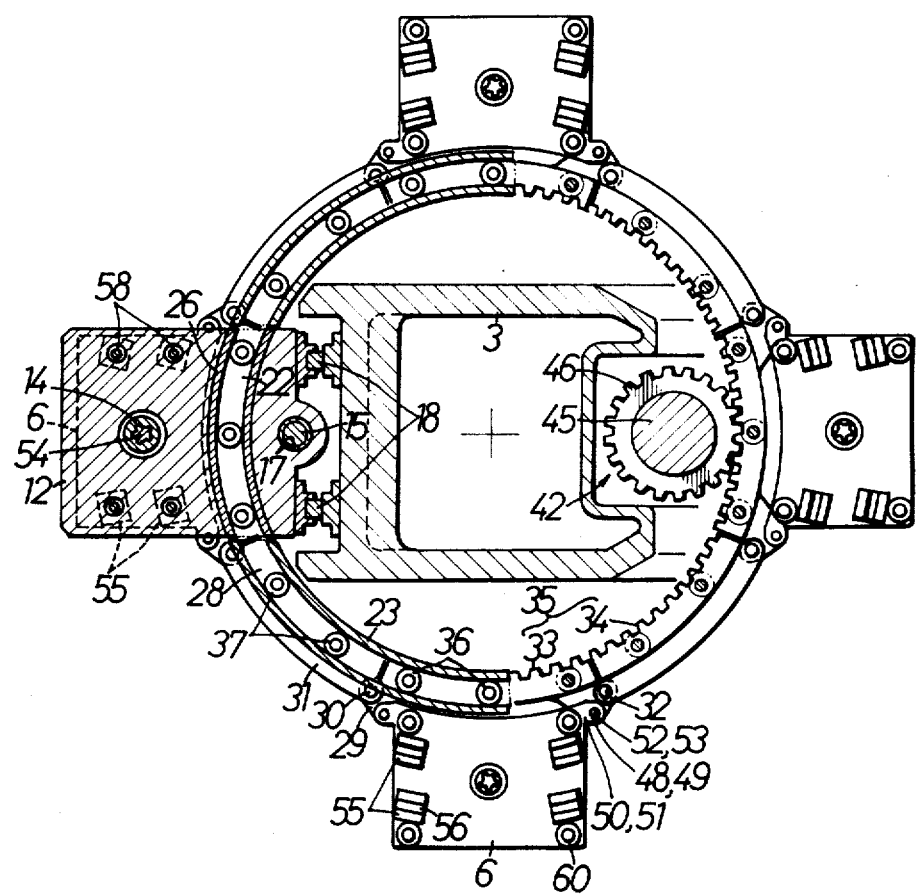
FIG. 3 is an enlarged sectional view taken along line III—III in FIG. 2.

Referring also to FIG. 3, the lift mechanism 5 includes a threaded rod 15 threadedly connected to the lift stand 12 of the drive mechanism 4 to extend vertically, and a feed motor 16 for rotatively driving the threaded rod 15. The rod 15 is disposed to extend vertically along the outer side surface of the post 3 and threadedly fitted in a threaded bore 17 in the lift stand 12. The threaded rod 15 is also rotatably journaled at its upper and lower ends by the post 3, and the feed motor 16 is connected to the upper end of the threaded rod 15 and fixed to the upper portion of the post 3. Moreover, the feed motor 16 is reversibly rotatable in opposite directions.

On the opposite sides of the threaded rod 15, a pair of vertically extending guide rails 18 are securely mounted on the outer side surface of the post 3, so that the lift stand 12 is fitted on the guide rails 18. Thus, the lift stand 12 inhibits the angular displacement of the threaded rod 15 about the axis thereof and moved up and down along both the guide rails 18 in accordance with the rotation of the threaded rod 15 by the activation of the motor 16.

A pair of vertically extending balance cylinders 19 are fixedly mounted on the upper portion of the post 3 and disposed on diametrically opposite sides of the lift stand 12, and each of the balance cylinders 19 has a rod slidably fitted therein and secured to the lift stand 12. This enables the lift stand 12 to be moved up and down with its horizontal position maintained.

Figure 4:
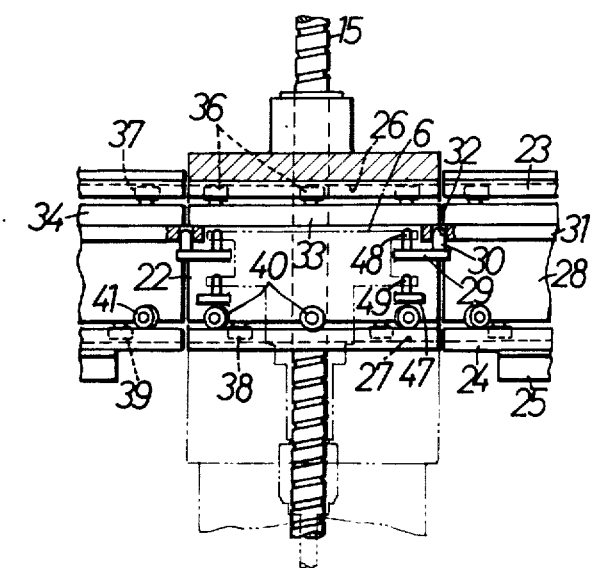
FIG. 4 is an enlarged sectional view taken along line IV—IV in FIG. 2.

Referring also to FIG. 4, the individual tool heads 6 are disposed at circumferencially spaced intervals of 90° around the post 3 to provide for the connection and holding of different boring bars 7 so as to accomodate the variation in type of workpiece W. The tool heads 6 are carried on the head carrier 22, respectively, so that movement of the head carrier 22 around the post 3 enables any tool head 6 and boring bar 7 to be brought into position at the working station S and thus at the drive mechanism 4.

A downwardly opened upper guide member 23 having a U-shaped cross section is securely mounted on the upper and outer side surface of the post 3 to form an arc with the drive mechanism 4 about the center of the post 3. Also below and at a spaced distance from the upper guide member 23, an upwardly opened lower guide member 34 haing a U-shaped cross section is fixedly mounted on the outer side surface of the post 3 by a bracket 25 to form an arc corresponding to that of the upper guide member 23.

On the other hand, the lift stand 12 of the drive mechanism 4 has an upper guide groove 26 and a lower guide groove 27 therein, the former being connected with the upper guide member 23 and the latter with the lower guide member 24 when the lift stand or rest 12 assumes a given uppermost limited position. Both the guide grooves 26 and 27 are curved with the same radius of curvature as that of the upper and lower guide members 23 and 24.

Each head carrier 22 is curved in an arc with a radius of curvature corresponding to that of the upper and lower guide members 23 and 24 and disposed between the upper and lower guide members 23 and 24. Connecting pieces 28 curved in an arc like the head carrier 22 are disposed between both the head carriers 22, each head carrier 22 being connected to the adjacent connecting piece 28.

More specifically, a connecting arm 29 is mounted at the circumferentially opposite ends of the head carrier 22 to project outwardly and arm 29 has a connecting pin 30 embedded in the fore end thereof. On the other hand, a connecting jaw 31 is projectedly mounted on the outer surface of the connecting piece 28 above the connecting arms 29 over the entire circumference, so that the connecting pins 30 may be inserted into connecting holes 32 in the opposite ends of the connecting jaw 31 to provide the interconnection between each head carrier 22 and each connecting piece 28.

Sector gears 33 and 34 are securely mounted on the upper portion of each head carrier 22 and on the upper portion of each connecting piece 28, respectively, and they collectively constitute an internal gear 35.

A plurality of rollers 36 and 37 are supported on the upper portion of the head carrier 22 and on the upper portion of the connecting piece 23, respectively and are rollable on the upper guide member 23 and in the upper guide groove 26. Further, a plurality of roller 38 and 39 and a plurality of rollers 40 and 41 are also supported on the lower portion of the head carrier 22 and on the lower portion of the connecting piece 28, respectively, the former rollers being rollable on the lower guide member 24 and in the lower guide groove 27, and the latter rollers being rollable on the outer and upper edge of the lower guide member 24 and in the lower guide groove 27. This enables each head carrier 22 and each connecting piece 28 to be guided and moved in the interconnected state between the upper and lower guide members 23 and 24 and between the upper and lower guide grooves 26 and 27, i.e., rotated around the post 3.

A index mechanism 42 is provided for the purpose of rotating each head carrier 22 and connecting piece 28 in this manner to bring any head carrier 22 and thus tool head 6 into the position at the drive mechanism 4. The index mechanism 42 is comprised of an index motor 43, a gear box 44 containing a gear train (not shown) for decelerationaly transmitting the driving force from the index motor 43, and a drive gear 46 fixed on the output shaft 45 of the gear box 44 and in mesh with the internal gear 35. The gear box 44 is fixed on the upper portion of the post 3, and the index motor 43 is fixed and supported on the upper portion of the gear box 44. The output shaft 45 projects downwardly out of the gear box 4 and has the drive gear 46 fixed at the lower end thereof.

With such index mechanism 42, the actuation of the index motor 43 enables the internal gear 35, i.e., the head carrier 22 and the connecting piece 28 to be rotated, thereby bringing a desired head carrier 22 into a position below the drive mechanism 4.

Figure 5:
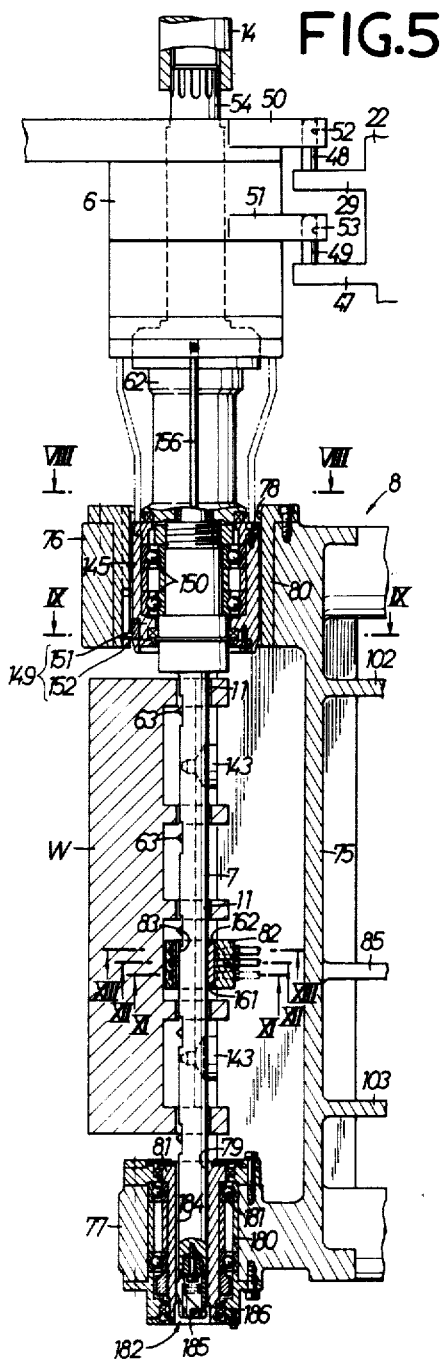
FIG. 5 is an enlarged view in vertical section of details at the completion of boring.

Referring also to FIG. 5, the tool head 6 is supported on the head carrier 22 for upward relative movement. More specificially, the head carrier 22 is integrally provided with a support arm 47 projected therefrom below the connecting arm 29, and a support pin 48 rises on each connecting arm 29 and a support pin 49 rises on each support arm 47. On the other hand, upper and lower arms 50 and 51 project from the tool head 6 and are restable on each connecting arm 29 and each support arm 47, respectively. Through holes 52 and 53 through which the support pins 48 and 49 can be respectively inserted are made in the arms 50 and 51, respectively. Moreover, the thickness of each the arms 50 and 51 is smaller than the length of the support pins 48 and 49, so that the tool head 6 can be relatively moved upwardly with respect to the head carrier 22 to move each of the arms 50 and 51 upwardly away from the connecting arm 29 and support arm 47 with the support pins 48 and 49 remaining inserted in the through holes 52 and 53 respectively.

A rotary shaft 54 having a vertical axis is journaled on the tool head 6 for rotation about the axis and has upper and lower opposite ends projecting from the tool head 6. Moreover, the length of rotary shaft 54 projecting upwardly from the tool head 6 is such that the upper end of the rotary shaft 54 will not reach the lower end of the output shaft 14 in the drive mechanism 4 when the arms 50 and 51 rest on the connecting arm 29 and support arm 47 respectively, but will be splinedly connected to the lower end of the output shaft 14 when the tool head 6 is moved up and fixed to the drive mechanism 4.

A plurality, for example, foru locking members 55 are secured on the upper surface of the tool head 6 in order to fix the tool head 6 to the drive mechanism 4. The locking members 55 each have an engaging groove 56 substantially T-shaped in cross section, and are fixedly disposed with their engaging grooves 56 extending along the circumference about the rotational center of the tool head 6. Four clamp cylinders 57 are fixedly supported on the upper surface of the lift stand 12 in the drive mechanism 4 to correspond to the respective locking members 55. The clamp cylinders 57 are each disposed with its axis vertical and each has a rod 58 movably passed through the lift stand 12 to project downwardly from the lift stand 12, which rod 58 has a substantially T-shaped engaging portion 59 provided at its lower end and capable of engaging the engaging groove 56 in each the locking members 55.

With each clamp cylinder 57 extended, the engaging portion 59 of each rod 58 is in a position to be engageable with the locking member 55 on the tool head 6 resting on the connecting jaw 31 and the support arm 47, and when the clamp cylinders 57 are retracted, the engaging portion 59 is engaged with the engaging member 55, thereby causing the tool head 6 to be pulled up.

A plurality, for example, four positioning pins 60 are mounted on the upper surface of the tool head 6, while four fitting tubes 61 into which the respective positioning pins 60 can be fitted are secured to the lower surface of the lift stand 12. When the tool head 6 is pulled up by the clamp cylinders 57, each positioning pin 60 is fitted into the respective fitting tube 61, thereby providing the positioning of the tool head 6. Moreover, each positioning pin 60 is provided with an upwardly-facing stepped portion on the outer surface thereof, so that the pulling up of the tool head 6 by the operation of the clamp cylinders 57 causes the stepped portion to abut against the lower surface of the fitting tube 61, thereby preventing further pulling-up action and permitting the tool head 6 to be fixed to the lift stand 12.

A boring bar 7 is connected at it upper end to the lower end of the rotary shaft 54 in the tool head 6 through a universal joint 62. Therefore, the boring bar 7 is suspended from the tool head 6 for swinging movement in all directions through 360° C. in a horizontal plane. The boring bar 7 has cutters 63 fixedly mounted on one side surface thereof at spaced locations each corresponding to that between the adjacent bearing bores 11 in a workpiece W to be bored.

Figure 6:
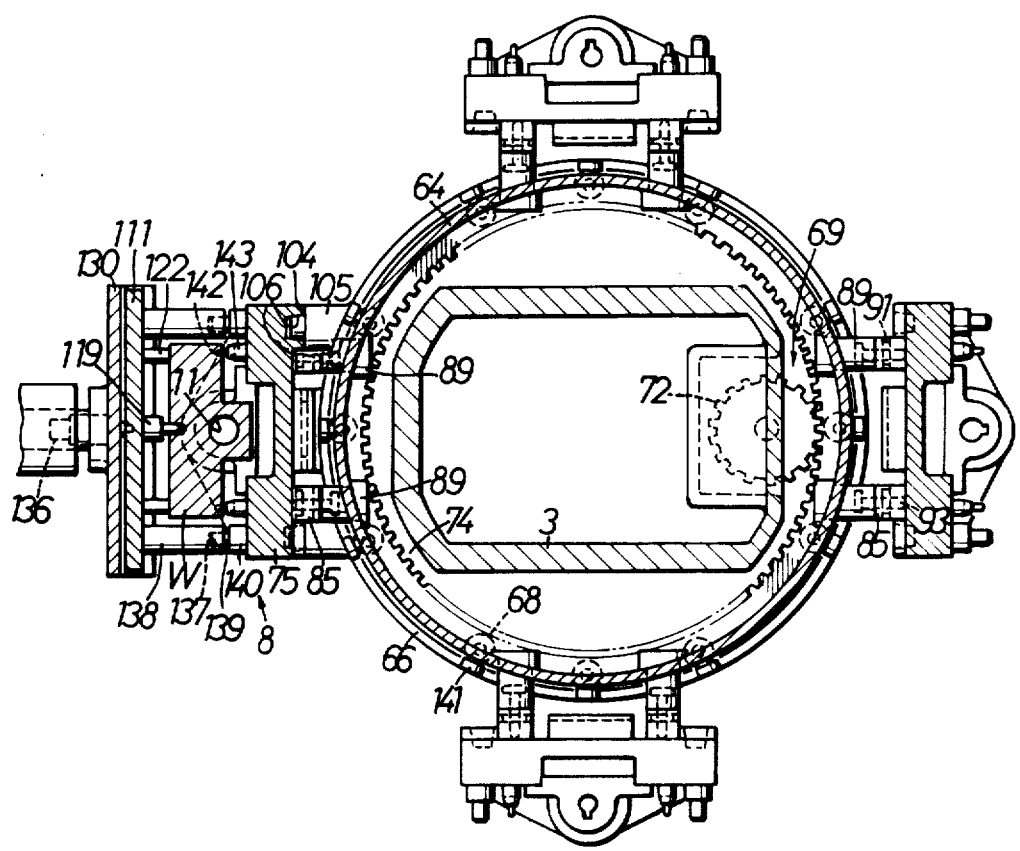
FIG. 6 is an enlarged sectional view taken along line VI—VI in FIG. 2.
Figure 7:
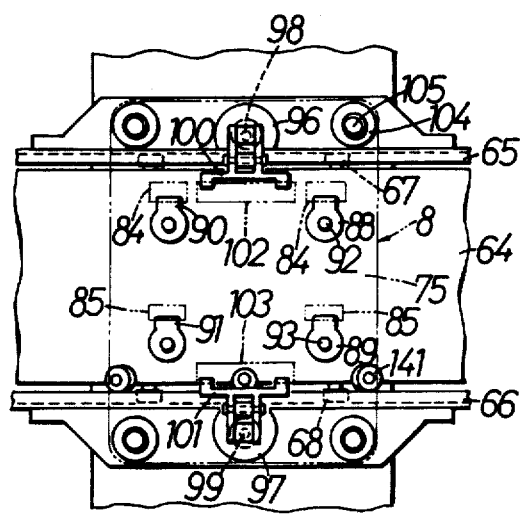
FIG. 7 is a view taken along line VII—VII in FIG. 2.

Referring to FIGS. 6 and 7, four support jigs are arranged on the lower portion of the post 3 at angularly spaced intervals of 90° around the post 3 for slidably and rotatably supporting bore bars 7 of different type, respectively. The support jigs 8 are carried on a cylindrical jig carrier 64 surrounding the post 3, so that the angular displacement of the jig carrier 64 about its vertical axis enables a desired jig 8 to be brought to the working station S.

An upper downwardly opened guide rail 65 of U-shaped cross section is fixed on the outer side surface at the lower portion of the post 3 along a phanton circumference about the center of the post 3, and a lower upwardly opened guide rail 66 is fixed at a location downwardly spaced from the upper guide rail 65 and along a phantom circumference corresponding to that of the upper guide rail 65.

The jig carrier 64 is disposed between the upper and lower guide rails 65 and 66. A plurality of rollers 67 are supported at spaced locations on the upper portion of the jig carrier 64 to roll within the lower guide rail 66, and a plurality of rollers 141 are supported at spaced locations to roll on the outer and upper edge of the lower guide rail 66. Therefore, the jig carrier 64 can be guided on the upper and lower guide rails 65 and 66 to rotate about the vertical axis.

For the purpose of rotationaly operating the jig carrier 64, an index mechanism 69 is disposed on the lower portion of the post 3. The index mechanism 69 includes an index motor 70, a gear box 71 containing a gear train (not shown) for decelerationaly transmitting the driving force from the index motor 70, a drive gear 72, and a gear train 73 for transmitting a driving force from the gear box 71 to the drive gear 72. The gear box 71 is secured to the lower portion of the post 3, and the index motor 70 is fixedly mounted on the lower portion of the gear box 71.

An internal gear 74 is securely mounted on the lower portion of the jig carrier 64, so that the drive gear 72 is in mesh with the internal gear 74. Therefore, the actuation of the index motor 70 causes the drive gear 72 to rotate the internal gear 74 and thus jig carrier 64.

The support jig 8 is comprised of a generally rectangular jig body 75, two bearing portions 76 and 77 integrally projecting at the upper and lower opposite ends of the jig body 75, and a bearing member 82 mounted on the jig body 75 between the bearing portions 76 and 77.

Figure 8:
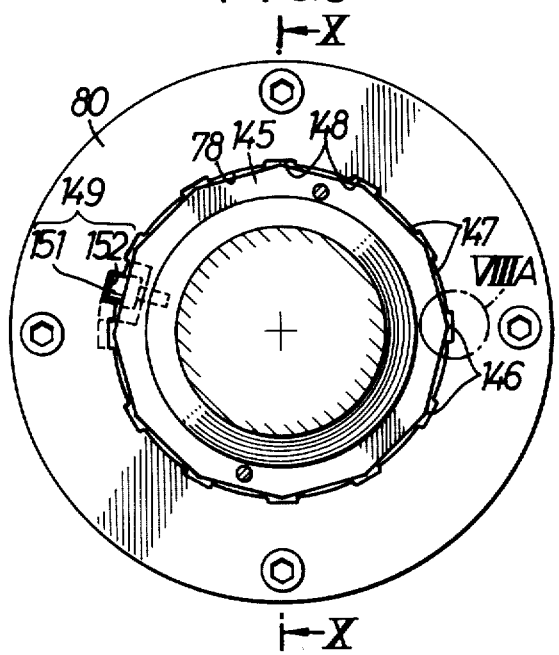
FIG. 8 is a sectional view at the start of insertion, taken along line VIII—VIII in FIG. 5.
Figure 9:
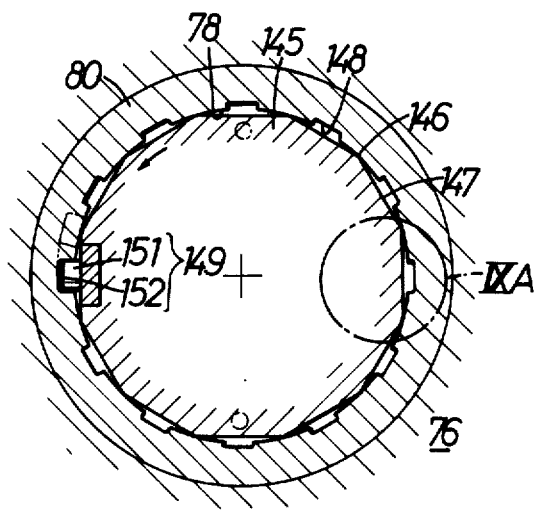
FIG. 9 is a sectional view taken along line IX—IX in FIG. 5.
Figure 10:
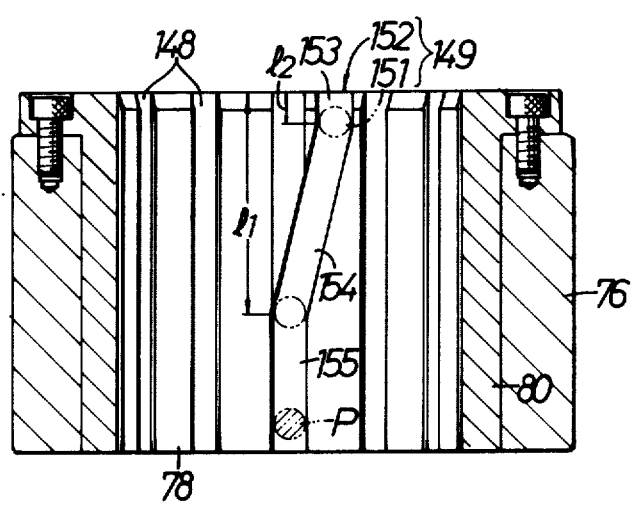
FIG. 10 is sectional view taken along line X—X in FIG. 8 with a boring bar omitted.
Figure 13:
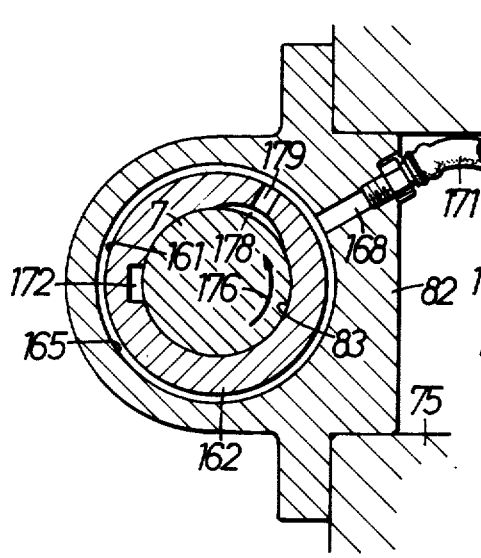
FIG. 13 is an enlarged view taken along line XIII—XIII in FIG. 5.
Figure 11:
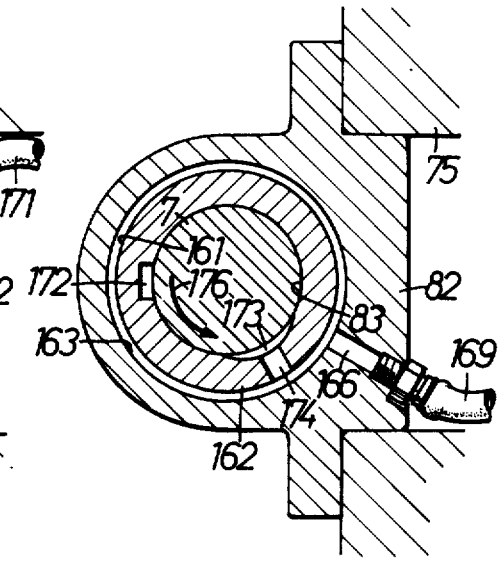
FIG. 11 is an enlarged view taken along line XI—XI in FIG. 5.
Figure 14:
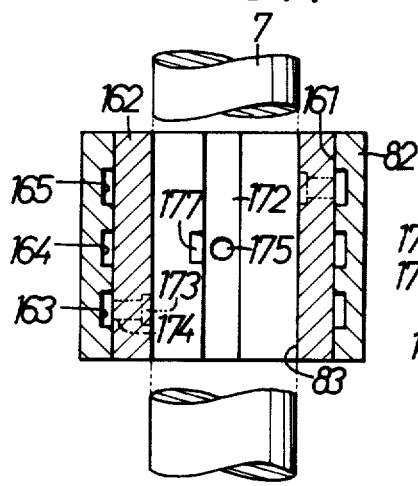
FIG. 14 is a sectional view taken along line XIV—XIV in FIG. 12 with the boring bar omitted.
Figure 12:
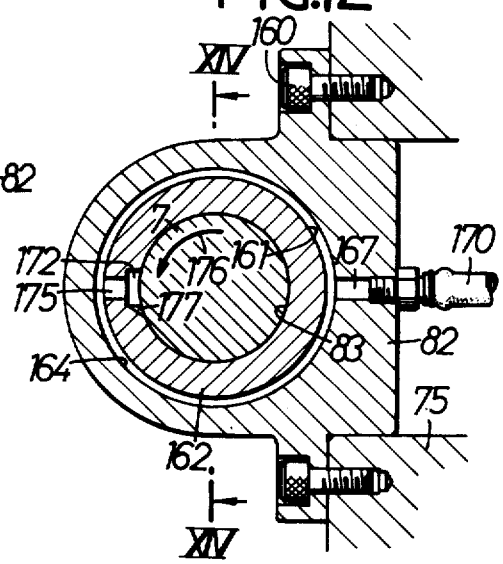
FIG. 12 is an enlarged view taken along line XII—XII in FIG. 5.

Referring to FIGS. 8, 9 and 10, the upper bearing portion 76 has a generally cylindrical support member 80 securely mounted thereon and having a vertically extending support hole 78. A support tube 145 is fitted over the upper portion of the boring bar 7 through a bearing 150 and is removably supported by the support member 80.

Figure 8A:
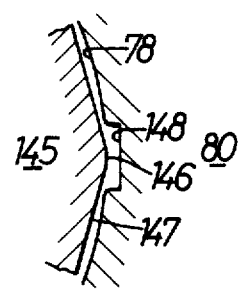
FIG. 8A is an enlarged view of the section encircled by the circular broken line VIIIA in FIG. 8.

The contour configuration in cross section of the support tube 145 is basically regularly polygonal, for example, regularly dodecagonal with a circular arc-shaped slide surface 146 at each apex as shown in FIG. 8A. In other words, the outer surface of the support tube 145 is shaped in an arc of a circle in a range of an extremely small central angle with a plurality of slide surfaces 146 arranged at circumferentially regular intervals being interconnected by a flat surface 147.

The support hole 78 in the suppport member 80 is shaped basically as a circle with an internal diameter corresponding to the contour configuration of the circular arc-shaped slide surface 146 and it has the same number of axially extending escape grooves 148 as the slide surfaces at circumferentially regular intervals on its inner surface.

The support tube 145 is inserted into the support hole 78 in the support member 80 when the boring bar 7 advances, i.e., moves down. At the start of insertion of the support tube 145, the slide surface 146 of the support tube 145 is in a position opposed to the escape groove 148 as shown in FIGS. 8 and 8A, and while the support tube 145 moves down by a given distance l1 from the start of insertion thereof, it is angularly displaced by the action of the guide mechanism 149, so that the slide surface 146 comes into slide contact with the inner surface of the support hole 78, as shown in FIGS. 9 and 9A.

The guide mechanism 149 is constituted by a pin 151 projecting from the outer side surface of the support tube 145, and a guide groove 152 provided in the inner surface of the support hole 78 to guide the pin 151 slidably fitted therein.

The pin 151 is mounted on the outer surface of the lower portion of the support tube 145 and projects outwardly from one of the flat surfaces 147. On the other hand, the guide groove 152 is provided over the entire length of the support hole 78 and consists of a first straight line portion 153, an inclined portion 154 and a second straight line portion 155, which are connected in sucession. The first straight line portion 153 extends over a relatively short distance l2 along the axis of the support hole 78 between two escape grooves 148. The inclined portion 154 extends over a distance (l1−l2) from the lower end of the first straigth line portion 153 at an inclination to escape groove 148. The second straight line portion 155 extends on one escape groove 148.

Figure 9A:
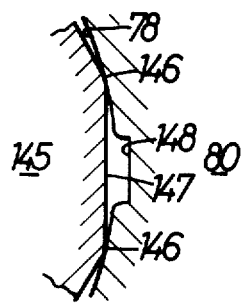
FIG. 9A is an enlarged view of the section encircled by the circular broken line IXA in FIG. 9.

With such guide mechanism 149, when the support tube 145 is moved down the distance l1 after being inserted into the support hole 78 with each slide surface 146 aligned with the respective escape groove 148, it is angularly displaced through half a central angle formed by two escape grooves 148 as the pin 151 is guided in the inclined portion 154 to assume a state as shown in FIGS. 9 and 9A. This state corresponds to a position to initiate the working of a workpiece W by the boring bar 7, and when the pin 151 is moved down along the second straight line portion 155 into a position P shown by a slant line in FIG. 10, the working is completed.

It is to be noted that at the start of insertion of the support tube 145 into the support hole 78, each slide surface 146 should be in a position opposed to each escape groove 148, and for maintaining such position, for example, a pair of torsion bars 156 may be provided between the tool head 6 and the support tube 145. The torsion bars 156 allow each slide surface 146 to return to the position opposed to each escape groove 148 when the support tube 145 is moved up out of the support hole 78.

Referring to FIGS. 11 to 14, the bearing member 82 is secured to the jig body 75 by a bolt 160 and has a through hole 161 coaxial to the support hole 78, into which is forced a cylindrical inner sleeve 162 having a support hole 83 capable of receiving a boring bar 7 inserted therein.

Three annular grooves 163, 164 and 165 are provided at spaced intervals in the inner surface of the through hole 161, and passage holes 166, 167 and 168 are provided in the bearing member 82 to communicate with the respective corresponding annular grooves 163, 164 and 165. Oil feed pipes 169, 170 and 171 for passage of a cutting oil are also connected to the respective corresponding passage holes 166, 167 and 168.

A pasage 172, through which each cutter 63 of boring bar 7 is passed, is made in the inner surface of the support hole 83 over its entire axial length.

At a location facing the lowermost annular groove 163, a recess 173 is provided in the inner surface of the support hole 83 in the inner sleeve 162 at a point displaced from the passage 172 and recess 173 is crescent-shaped in cross section to become shallower in the circumferentially opposite directions, and an oil feed passage 174 connecting the recess 173 with the annular groove 163 is made in the inner sleeve 162.

In addition, at a location facing the middle annular groove 164, an oil feed passage 175 is provided in the inner sleeve 162 to connect the middle annular groove 164 with the passage 172. At a location facing the oil feed passage 175, the fore side of the passage 172 in the direction 176 of rotation of the boring bar 7 is cut out in the rotational direction 176 to provide a notch 177 which becomes shallower in the rotational direction 176.

Further, at a location facing the uppermost annular groove 165, a recess 178 having a configuration similar to that of the recess 173 is provided in the inner surface of the support hole 83 at a point displaced from the recess 173, and an oil feed passage 179 is provided in the inner sleeve 162 to provide the connection between the recess 178 and the annular groove 165.

In the manner, a cutting oil supplied through the individual oil feed pipes 169, 170 and 171 is passed into the recesses 173 and 178 as well as into the passage 172 and the notch 177 and the cutting oil enters the space between the outer surface of the boring bar 7 and the inner surface of the support hole 83 as the boring bar 7 is rotated, so that the boring bar 7 is supported by the inner sleeve 162 under the action of the cutting oil.

Figure 15:
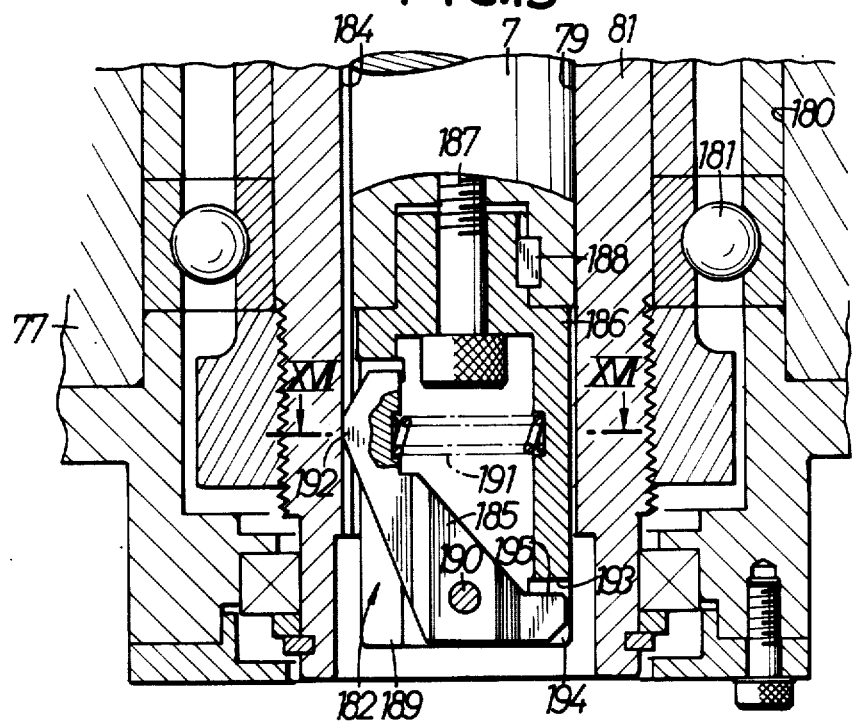
FIG. 15 is an enlarged view in vertical section of details for illustrating the support of the lower end of the boring bar.
Figure 16:
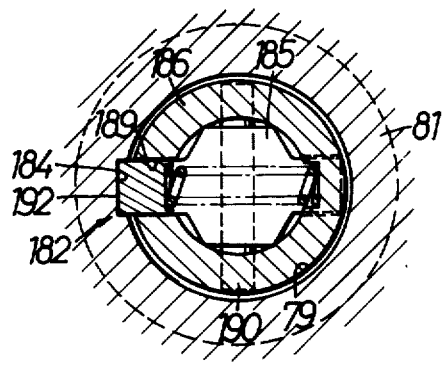
FIG. 16 is a sectional view taken along line XVI—XVI in FIG. 15.

Referring to FIGS. 15 and 16, the lowermost bearing portion 77 has a through hole 180 there coaxial to the bearing member 82, so that a generally cylindrical rotary tube 81 is rotatably supported in the through hole 180 through a bearing 181. The rotary tube 81 receives the lower end of the removably inserted boaring bar 7, and a positioning mechanism 182 is provided between the boring bar 7 and the rotary tube 81 for accurately positioning the boring bar within the rotary tube 81.

The positioning mechanism 182 is constituted by a groove 184 provided axially in the inner surface of the support hole 79 in the rotary tube 81 over its entire length, and an urging piece 185 resiliently biased into sliding contact with the bottom of the groove 184 and supported at the lower end of the boring bar 7.

A generally cylindrical support member 186 is fixedly mounted on the lower end of the boring bar 7 by a bolt 187 and a key 188 and member 186 has an axially extending slit 189 opposed to the groove 184.

The urging piece 185 is slidably fitted in the slit 189 and rotatably supported at the lower end of the support member 186 by a suport shaft 190 perpendicular to the axis of the boring bar 7. Furthermore, a spring 191 is compressively mounted between the inner side surface of the support member 186 oppoisite the slit 189 and the urging piece 185, so that the spring force of the spring 191 causes the urging piece 185 to be resiliently biased with one end thereof projecting outwardly from the slit 189. The outer surface at one end of the urging piece 185 is formed with a flat urging surface 192 adapted to come into sliding contact with the bottom of the groove 184. Further, on the side opposite the slit 189, a relatively short restricting slit 194 is provided in the lower end of the support member 186 and formed with a downwardly facing restricting surface 193. The other end of the urging piece 185 has an abutment surface 195 adapted to abut against the restricting surface 193 and is slidably fitted in the restricting slit 194. Therefore, the amount of urging piece 185 projected from the slit 189 is restricted before the abutment surface 195 abuts against the restricting surface 194.

With such positioning mechanism 182, when the boring bar 7 is inserted into the rotary tube 81, the urging surface 192 of the urging piece 185 resiliently abuts against the bottom of the groove 184, so that the boring bar 7 is urged away from the groove 184 and necessarily forced into a close contact with the inner surface of the support hole 79 on the side opposite the groove 184, whereby the position of the axial center of the boring bar 7 is always steadily maintained.

The support jig 8 is supported on the jig carrier 64 for movement toward and away from the jig carrier 64 within a restricted range.

More particularly, the jig body 75 of the support jig 8 includes a pair of upper support projections 84 and a pair of lower support projections 85, which are mounted on the side opposite the bearing portions 76 and 77. Downwardly bent stoppers 86 and 87 are mounted on the upper and lower projections 84 and 85, respectively. An pair of upper holding cylinders 88 and a pair of lower holding cylinders 89 are arranged on the jig carrier 64 at circumferentially spaced intervals of 90° to mate with both the upper support projections 84 and the lower support projections 85, respectively. Each of the holding cylinders 88 and 89 has an axis parallel to one diametrical line of the jig carrier 64 and is fixed to pass through the jig carrier 64. Respective ones of the pairs of the holding cylinders 88 and 89 have upwardly extending protrusions 90 and 91 mounted on the upper portions of their projected ends for receiving the lower surfaces of the upper and lower support projection 84 and 85 thereon, respectively. Further, urging pins 92 and 93 are project from the projected ends of both the holding cylinders 88 and 89, respectively. The urging pins 92 and 93 are project from the projected ends of both the holding cylinders 88 and 89, respectively. The urging pins 92 and 93 are biased by springs 94 and 95 contained within the corresponding holding cylinders 88 and 89, respectively.

With such arrangement, the support jig 8 is urged by the urging pins 92 and 93 with the upper and lower support projections 84 and 85 placed on the protrusions 90 and 91 on the side of the jig carrier 64 and is supported on the jig carrier 64 with the stoppers 86 and 87 abuting against the corresponding protrusions 90 and 91. If the jig carrier 8 is brought into the working station S in such state, then the axes of the support holes 78, 83 and 79 in the support jig 8 are off of the axis of the boring bar 7 located above them, and for the boring, it is necessary to move and fix the support jig 8 closer to the jig carrier 64.

When the support jig 8 is positioned at the working station S, a jig clamp cylinder 96 and a jig clamp cylinder 97 are arranged on the side portion of the post 3 at the upper and lower portions of the jig body 75, respectively. The jig clamp cylinders 96 and 97 each have a rod 98 and 99 provided therein and extending outwardly along one diametrical line of the jig carrier 64 with the leading ends of the rods 98 and 99 connected to one of the ends of clamp members 100 and 101, respectively. Each of the clamp members 100 and 101 is supported on the post 3 with its middle portion as a fulcrum and is pivotally movable about the horizontal axis with the expanding or contracting operation of the jig clamp cylinders 96 and 97.

The jig body 75 of the support jig 8 is integrally provided with an L-shaped bent locking projection 102 engageable by the other end of the upper clamp member 100, and an L-shaped bent projection 103 engageable by the other end of the lower clamp member 101.

Four knock pins 105 each having a restricting stepped portion 104 facing outwardly are projectedly mounted on the side portion of the post 3 to face the working station S, and four positioning holes 106 are perforated in the jig body 75 to correspond to the knock pins 105, respectively.

In a section at the working station S, a bellows-like cover 107 is mounted over the threaded rod 15 to extend between the lower portion of the post 3 and the lower portion of the lift stand 12 of the drive mechanism 4. Therefore, the threaded rod 15 is always covered, regardless of the upward or downward movement of the drive mechanism 4.

The transfer mechanism 10 is comprised of a pallet guide rail 110 horizontally disposed on the side of post 3 opposite the working station S, and a pallet 111 guided on the guide rail 110 with a workpiece W supported and fixed thereon. The pallet guide rail 110 is constituted of an upper guide portion 114 consisting of a pair of opposed guide plates 112 and a plurality of guide rollers 113 arranged between the guide plates 112, and a lower guide portion 117 consisting of a pair of opposed guide plates 115 and a plurality of guide rollers 116 arranged between the guide plates 115, the upper and lower guide portions being interconnected by a connecting member 118 and oriented horizontally except in the section at the working station S.

The pallet 111 is formed as a flat plate, and is guided on the upper and lower guide portions 114 and 117 of the pallet guide rail 110 and thus transferred or conveyed to or from a position at the working station S. The pallet 111 is provided with a plurality of positioning pins 119 adapted to be fitted into a workpiece W, upper and lower clamp members 120 and 121 adapted to engage the workpiece W for fixing it, and an abutment pin 122 adapted to abut against the workpiece W. Upon the fitting of the clamp members 120 and 121 to the workpiece W with the positioning pins 119 fitted into the workpiece W and the workpiece W abutting against the abutment pins 122, the workpiece W is fixed on the pallet 111 with bearing hole 11 being vertical.

The work support mechanism 9 is disposed in place at the working station S on the side opposite the post 3. The work support mechanism 9 includes a moving stand 125 movable in a horizontal direction perpendicular to the transfer mechanism 10, an urging cylinder 126 for horizontally driving the moving stand 125, a stop position switch-over cylinder 127 adapted to abut against the moving stand 125 for restricting the horizontal movement of the moving stand 125 in two steps, a reverse motor 128 fixed to the moving stand 125, and a pallet holding frame 130 fixed on the leading end of an output shaft 129 of the reverse motor 128.

The moving stand 125 is movable along a pair of guide bars 131 fixedly mounted on the base plate 2 in a horizontal direction perpendicular to the transfer mechanism 10, and a rod 132 of the urging cylinder 126 is connected to the moving stand 125. The urging cylinder 126 is fixed at the end of the base plate 2 on the side opposite the post 3 with respect to the working station S, so that its expanding or contracting operation causes the moving stand 125 to be moved toward or away from the working station S.

A stop position switch-over cylinder 127 is opposed to the moving stand 125 at a location near the working station S, a rod of cylinder 127 and can switch over the stop position of the moving stand 126 depending on whether the rod is in the extended or retracted states. In other words, when the moving stand 125 is allowed to abut against the extended rod 133, and when the moving stand 125 is brought into abutment against the retracted rod 133, the stop position of the moving stand 125 is switched over.

The output shaft 129 of the reverse motor 128 is rotatably passed through the moving stand 125 and it projects toward the working station S, a pallet holding frame 130 being fixed to the leading end of the output shaft 129. The pallet holding frame 130 is generally formed as a flat plate and has guide grooves 134 and 135 provided at the upper and lower opposite ends thereof to correspond to the upper and lower guide portions 114 and 117, respectively. Further, a pair of clamp cylinders 136 are arranged on the pallet holding frame 130 and adapted to abut against the pallet 111 for fixing it, so that by expanding the clamp cylinders 136 when the pallet 111 fitted in the guide grooves 134 and 135, the pallet 111 is supported and fixed on the pallet holding frame 130.

With such workpiece support mechanism 9, a workpiece W conveyed by the transfer mechanism 10 can be moved to the working station S in two steps and supported. More specifically, upon the expansion of the urging cylinder 126 in the expanded state of the stop position switch-over cylinder 127, the workpiece W is brought in a direction opposite to the post 3 into a position of alignment with the axis of the bearing hole 11 slightly displaced from the boring bar 7 and then, the urging cylinder 126 is expanded in the contracted state of the stop position switch-over cylinder 127, whereby the workpiece W can be moved to a position with the axis of the bearing hole 11 aligned with the boring bar 7 and thus fixedly supported.

A pair of guide posts 138 having a fitting hole 137 at the fore end thereof are mounted on and project from the pallet 111 toward the post 3 to guide the movement of the workpiece W in to the position in which the axis of the bearing hole 11 is aligned with the boring bar 7. A positioning pin 140 is projectedly mounted on the jig body 75 of the support jig 8 and has at its fore end a fitting projection 139 fittable in the fitting hole 137. In addition, a plurality of positioning holes 142 are formed in that surface of the workpiece W held by the pallet 111 which is opposed to the support jig 8, while a plurality of positioning pins 143 are projectedly mounted on the jig body 75 in the support jig 8 and adapted to be fitted into the positioning holes 142, respectively.

Description will now be made of the operation of this embodiment. A workpiece W is transported by the transfer mechanism 10 to a position at the working station S. Thereupon, the pallet 111 supporting the workpiece W is fitted into both the guide grooves 134 and 135 of the pallet holding frame 130. In this state, the clamp cylinder 136 is operated to expand, thereby causing the pallet 111 to be fixed to the pallet folding frame 130. Then, the urging cylinder 126 is operated to expand with the stop position switch-over cylinder 127 remaining expanded, so that the moving stand 125 is moved until it abuts against the rod 133 of the stop position switch-over cylinder 127, whereby the workpiece W is passed to a position with the axis of the bearing hole 11 slightly displaced from the boring bar 7 on the side opposite the post 3 rather than being just below the boring bar 7.

In this state of workpiece W, the feed motor 16 of the lift mechanism 5 is actuated to rotatively drive the threaded rod 15, thereby lowering the drive mechanism 4, the tool head 6 and the boring bar 7. In this case, the axis of the bearing hole 11 in the workpiece W is displaced on the order of several mm from the boring bar 7, and the boring bar 7 is at rest in a fixed position with each cutter 63 correctly oriented in a direction opposite the post 3, so that the boring bar 7 can be inserted through the bearing hole 11 without any interference of the cutters 63 with the bearing hole 11.

At this lowering, the boring bar 7 is concentrically inserted into the support holes 78, 83 and 79 in the support jig 8, and when the support tube 145 fitted over the upper portion of the boring bar 7 is inserted into the support hole 78, it is inserted into the support hole 78 while being slightly angularly displaced by the action of the guide mechanism 149. Thus, the support tube 145 starts to be inserted in the state with the slide surface 146 thereof opposed to the escape groove 148. In this state, a space is produced between the support tube 145 and the support hole 78 as shown in FIGS. 8 and 8A to ensure that the insertion is extremely easily conducted, while even if chip and cutting oil are present in the space between the support tube 145 and the support hole 78, they may be discharged from the space and thus, scuffing will not be produced.

When the support tube 145 is lowered by the distance l1 from the start of inserting, the slide surface 146 is in slide contact with the inner surface of the support hole 78 as shown in FIGS. 9 and 9A, and in this state, the support tube 145 is concentrically supported in the support hole 78.

On the other hand, when the lower end of the boring bar 7 is inserted into the support hole 79, the urging piece 185 is slidably fitted in the groove 184, and the operation of the positioning mechanism 182 including the urging piece 185 causes the lower end of the boring bar 7 to be lowered while being in close contact with the inner surface of the support hole 79 on the side opposite the groove 184. Consequently, regardless of whether the internal diameter of the support hole 79 is larger than the contour of the boring bar 7, with an allowance included therein, the axial center of the lower end of the boring bar 7 is always in the same position with respect to the support hole 79.

In the state of the support tube 145 slightly displaced angularly and concentrically held in the support hole 78, i.e., when the pin 151 of the support tube 145 has reached the upper end of the second straight line portion 155 in the guide groove 152, each cutter 63 of the boring bar 7 is above the corresponding bearing hole 11 as shown in FIG. 17, and in this state, the axis of each bearing hole 11 remains displaced from the axis of the boring bar 7.

Then, the stop position switch-over cylinder 127 is operated to contract, while the urging cylinder 126 is operated to expand again. This enables the moving stand 125 to advance by an amount corresponding to the retraction of the rod 133 of the stop position switchover cylinder 127, thereby causing the workpiece W supported on the pallet 111 fixed to the pallet holding frame 130 to be moved several mm toward the post 3. Thus, the axis of the bearing hole 11 in the workpiece W is aligned with the axis of the boring bar 7, as shown in FIG. 18. Moreover, in this case, the positioning pin 143 of the support jig 8 is fitted in the positioning hole 142 in the workpiece W to provide the positioning of the workpiece W.

Thereafter, the boring bar 7 is lowered by the lift mechanism 5 while being rotated by the drive mechanism 4, whereby the boring of the bearing hole 11 by each cutter 63 is conducted.

During this boring operation, a cutting oil is being supplied into a space between the inner sleeve 162 press fit in the bearing member 82 in the support jig 8 and the boring bar 7 and hence, even if the boring bar 7 is rotated at a higher speed, seizure can not occur, thus making it possible to conduct higher accuracy boring while maintaining the axial center of the boring bar 7 with a higher precision.

In addition, since the boring bar 7 is suspended for pivotal movement in all directions, even if the axis of the bearing hole 11 in the workpiece W at the working station S is not completely vertical, such displacement can be absorbed to accurately affect the boring.

When the boring is completed, the stop position switchover cylinder 127 is operated again to expand. This causes the moving stand 125 to be retracted several mm away from the post 3 and the axis of the bearing hole 11 to be offset from the axis of the boring bar 7. In this state, the boring bar 7 is raised, wherein each cutter 63 can not come into contact with the bearing hole 11 and hence, produces any scratches such as cutter marks in the bearing hole 11. Thereafter, the urging cylinder 126 is contracted to retract the pallet holding frame 111 to the position of the transfer mechanism 10 and further, the clamp cylinder 136 is contracted to release the pallet 111 clamped on the pallet holding frame 130, and the pallet 111 is then transferred out of the working station S by the transfer mechanism 10.

In this manner, the boring of the workpiece W is completed. With a workpiece W changed in type, the boring bar 7 and support jig 8 varying in type depending on the type of the workpiece W can be disposed in a position at the working station S, as required.

More particularly, the index motor 43 of the index mechanism 42 may be actuated to move a tool head 6 having a desired boring bar 7 supported thereon to a position at the working station S, so that such tool head 6 can be fixed to the drive mechanism 4 by the clamp cylinder 57. In addition, the index motor 70 of the index mechanism 69 may be actuated to move a desired support jig 8 to a position at the working station S, and the operation of the clamp cylinders 96 and 97 enables such support jig 8 to be fixedly located at the working station S. Therefore, the boring bar 7 and the support jig 8 can be easily and rapidly replaced by another depending on the variation in type of workpiece W to provide for the production of a variety of articles in a small quantity.

In the work support mechanism 9, the reverse motor 128 is mounted to provide for the reverse of a workpiece W in the event when the workpiece W is subjected to the slicing of its end surface in addition to the boring and therefore, it can be dispensed with when only the boring is intended to be carried out.

What is claimed is:

1. A process for boring a workpiece having a plurality of axially spaced holes which are to be bored over a relatively great distance in the axial direction of the workpiece, comprising the steps of:
  suspending for universal pivotal movement a boring bar which has a plurality of cutters provided thereon at axially spaced positions and extending radially eccentrically at one side of the bar, said cutters being adapted for boring a plurality of holes in a workpiece provided on a common axis at axially spaced positions;
  bringing and locating the workpiece to a position below the boring bar with the axis of said holes being vertical and transversely offset from the axis of the boring bar and then lowering said boring bar while holding the offset location of the bar relative to the holes to pass the boring bar through the holes in the workpiece, so as to avoid contact of the cutters on the bar with the holes, slidably and rotatably supporting the boring bar at least at two points thereof axially spaced apart from each other, aligning the axis of the boring bar and the axis of the holes in the workpiece by transversely displacing the workpiece relative to the boring bar; and effecting boring of said holes by providing relative rotation and axial movement between the boring bar and the workpiece and the axis of the boring bar remaining aligned with the axis of the workpiece.

2. A process as claimed in claim 1 wherein the axis of the boring bar and the axis of the holes in the workpiece are aligned before boring by transversely moving the workpiece relative to the bar.

3. A process as claimed in claim 2 wherein the aligning of the axis of the boring bar and the axis of the holes in the workpiece is effected while the workpiece remains rotatably and slidably supported at said at least two points.

4. A process as claimed in claim 1 wherein said axial holes in the workpiece are formed in axially spaced bearing portions of the workpiece, said boring bar being lowered eccentrically through the workpiece until each cutter is brought to a position axially slightly offset from the hole in the respective bearing portion which it is to bore whereafter when the axis of the boring bar and the axis of the hole are aligned, the cutters will be in operative position to bore the holes in the bearing portions when relative rotation and axial movement is provided between the boring bar and the workpiece.

5. A process as claimed in claim 4 comprising eccentrically positioning the boring bar and the workpiece after the boring operation and raising the boring bar from the holes in the workpiece in eccentric relation to avoid contact of the cutters with the bored holes.

6. A process as claimed in claim 1 wherein the boring bar is supported at one of said points by a support tube in a support member, said support tube moving axially in said support member during axial insertion of the boring bar into the workpiece, said support tube having a released position for loose insertion of the boring bar into the hole and an engaged position when the boring bar bores the holes in the workpiece, said support tube and support member undergoing relative angular movement when going between said released and engaged positions during relative axial travel of the boring bar prior to the boring of said holes.

7. A process as claimed in claim 6 comprising resiliently and tightly engaging the boring bar in a slidable and rotatable bearing at one of said other points at which the bar is slidably and rotatably supported when the boring bar has been passed through said hole.

8. An apparatus for boring a plurality of axially spaced holes in a workpiece over a relative great distance in the axial direction of the workpiece, comprising:

a vertical post;

a tool head movably supported on said post around the circumference thereof and including a vertical rotary shaft;

a boring bar having an upper end and provided with a plurality of cutters extending radially and eccentrically at one side of the bar at axially spaced positions thereon;

a universal joint connecting the upper end of the boring bar to the rotary shaft to suspend the boring bar from the tool head for universal pivotal movement;

a support jig including at least two bearing portions disposed on said post for slidably and rotatably supporting said boring bar; and means for supporting the workpiece for selective positioning of the holes in the workpiece with respect to the boring bar between eccentric and concentric positions, said support means being operable to hold the workpiece in the eccentric position relative to the bar, when the bar is passed through the holes in the workpiece in order to avoid contact of the cutters with the holes and to hold the workpiece in the concentric position relative to the bar during the boring operation.

9. Apparatus as claimed in claim 8, comprising a drive mechanism including a rotary drive motor liftably disposed on said post, a lift mechanism on said post for lifting said drive mechanism on said post, said vertical rotary shaft being connectable to said rotary drive motor and detachably connected to said drive mechanism, a jig carrier for supporting a plurality of support jigs around said post, means supporting said jig carrier for rotation about a vertical axis of the post, and an index mechanism connected to the jig carrier for angularly moving a desired support jig to a position below the boring bar.

10. Apparatus as claimed in claim 9 comprising a plurality of said tool heads arranged around said post, a head carrier supporting said tool heads and disposed for rotation around said post, and another index mechanism connected to the head carrier to angularly displace a desired tool head to a position at said drive mechanism.

11. An apparatus for boring a workpiece according to claim 10, wherein said support means includes a movable stand including a holding frame for detachably holding a pallet for supporting and fixing the workpiece and being movable to a position below the boring bar, and a stop position switch-over cylinder positioned to restrict the movement of the movable stand in two steps and including a rod for abutting against the movable stand in two positions, in one of said positions the axis of the holes in the workpiece being displaced from the axis of the boring bar to assume said eccentric position and in the other of said positions the axis of the holes being aligned with the boring bar to assume said concentric position thereby to enable the boring bar to be inserted through said holes.

12. Apparatus as claimed in claim 11 comprising a generally regular polygonal support tube fitted on said boring bar and having an external surface with plurality of apices and a circularly arcuate slide surface at each apex, and a support member fixedly mounted on one of said bearing portions of said support jig, said support member having a generally circular support hole with an internal diameter corresponding to that of said slide surface, and axially extending escape grooves at circumferentially regular spaced intervals in the same number as said slide surfaces, said support tube being insertable into said support member, and guide means between said support member and said support tube for angularly displacing said support tube relative to said support member to cause each slide surface facing a corresponding escape groove to come into sliding contact with an inner surface of said suppor hole when the support tube advances a given distance after the start of insertion thereof into said support member.

13. An apparatus for boring a hole in a workpiece over a relative great distance in the axial direction, comprising:
- a vertical post;
- a tool head movably supported on said post and including a vertical rotary shaft;
- a boring bar having an upper end;
- a universal joint connecting the upper end of the boring bar to the rotary shaft to suspend the boring bar from the tool head for universal pivotal movement;
- a support jig including at least two bearing portions disposed on said post for slidably and rotatably, supporting said boring bar; and
- support means for supporting the workpiece for selective positioning of the hole in the workpiece with respect to the boring bar between eccentric and concentric positions;
- said support means including a movable stand including a holding frame for detachable holding a pallet for supporting and fixing the workpiece and being movable to a position below the boring bar, and stop position switch-over cylinder positioned to restrict the movement of the moving stand in two steps and including a rod for abutting against the moving stand in two positions, in one of said positions the axis of the hole in the workpiece being displaced from the axis of the boring bar to assume said eccentric position and in the other of said positions the axis of the hole being aligned with the axis of the boring bar to assume said concentric position thereby to enable the boring bar to be inserted through said hole.

14. An apparatus for boring a hole in a workpiece over a relative great distance in the axial direction, comprising:
- a vertical post;
- a tool head movably supported on said post and including a vertical rotary shaft;
- a boring bar having an upper end;
- a universal joint connecting the upper end of the boring bar to the rotary shaft to suspend the boring bar from the tool head for universal pivotal movement;
- a support jig including at least two bearing portions disposed on said post for slidably and rotatably supporting said boring bar;
- support means for supporting the workpiece for selective positioning of the hole in the workpiece with respect to the boring bar between eccentric and concentric positions;
- a generally regular polygonal support tube fitted on said boring bar and having an external surface with plurality of apices and a circularly arcuate slide surface at each apex;
- a support member fixedly mounted on one of said bearing portions of said support jig, said support member having a generally circular support hole with an internal diameter corresponding to that of said slide surface, and axially extending escape grooves at circumferentially regular spaced intervals in the same number as said slide surfaces, said support tube being insertable into said support member; and
- guide means between said support member and said support tube for angularly displacing said support tube relative to said support member to cause each slide surface facing a corresponding escape groove to come into sliding contact with an inner surface of said support hole when the support tube advances a given distance after the start of insertion thereof into said support member.

15. A process for boring a workpiece disposed at a working station located adjacent the lower portion of a vertical support post, said post having a substantially cylindrical configuration and being provided with a plurality of working tools around the outer periphery of the post, said tools being spaced from each other and movable circumferentially of the post such that a desired one of the tools can be moved to a position above the workpiece of the working station and lowered to bore the workpiece, said process comprising the steps of:
- providing the workpiece with a plurality of holes to be bored on a common axis at axially spaced positions over a relatively long distance;
- vertically suspending a boring bar as said tool for universal movement at the working station, said boring bar having a plurality of cutters thereon at axially spaced positions projecting in a radial direction at one side of the bar;
- bringing and locating the workpiece to a position below the boring bar with the axis of said holes being vertical and radially offset from the axis of the boring bar and then lowering said boring bar while maintaining the offset location of the bar relative to the holes to pass the boring bar through the holes in the workpiece without contact of the cutters on the bar with the holes, and rotatably supporting the boring bar at least at two points axially spaced apart from each other; and
- displacing the workpiece relative to the boring bar to align the axis of the boring bar and the axis of the holes in the workpiece and effecting boring of said holes while rotating said bar around its axis.

16. An apparatus for boring a plurality of axially spaced holes in a workpiece over a relatively great distance in the axial direction thereof, said apparatus comprising:
- a vertical support post;
- a plurality of tool heads having respective axes of rotation and movably supported on said post at circumferentially spaced positions, said tool heads being selectively movable to a working station located adjacent the post and being capable of ascending and descending movements at said working station;
- a plurality of boring bars constituting working tools vertically suspended from respective tool heads for universal movement, said boring bars each including a plurality of cutters thereon at axially spaced positions projecting radially at one side of the boring bar;
- a universal joint for each boring bar connecting an upper end of the boring bar to a vertical rotary shaft of the tool head to suspend the bar for said universal movement;
- a support jig including at least two bearing portions disposed on said post at the working station for slidably and rotatably supporting the boring bar at the working station; and
- support means for supporting a workpiece, which has a plurality of holes to be bored on a common axis and at axially spaced positions over a relatively great distance, for selective positioning of the holes in the workpiece with respect to the boring bar between eccentric and concentric positions relative to the axis of the boring bar;

said support means including means for holding the workpiece in the eccentric position relative to the bar, when the par is passed through the holes in the workpiece at said working station, in order to avoid contact of the cutters with the holes and for holding the workpiece in the concentric position relative to the bar during the boring operation.

* * * * *

UNITED STATES PATENT AND TRADEMARK OFFICE
CERTIFICATE OF CORRECTION

PATENT NO. : 4,701,081
DATED : Oct. 20, 1987
INVENTOR(S) : Hitoshi Hashimoto, et al.

It is certified that error appears in the above—identified patent and that said Letters Patent is hereby corrected as shown below:

On the title page, add the following additional priority data:

--Jan. 17, 1986 [JP]     Japan                    7618/86

Signed and Sealed this

Fifth Day of July, 1988

Attest:

DONALD J. QUIGG

Attesting Officer                Commissioner of Patents and Trademarks